United States Patent [19]
Pitner

[11] 3,753,277
[45] Aug. 21, 1973

[54] METHOD OF MAKING UNIVERSAL JOINTS
[75] Inventor: Alfred Pitner, Paris, France
[73] Assignee: Nadella, Rucil-Malmaism, France
[22] Filed: May 4, 1972
[21] Appl. No.: 250,135

Related U.S. Application Data
[62] Division of Ser. No. 883,147, Dec. 8, 1969, Pat. No. 3,660,989.

[30] Foreign Application Priority Data
Jan. 24, 1969 France.............................. 6901314

[52] U.S. Cl................................ 29/148.4 A, 64/17
[51] Int. Cl............................................ B23p 11/00
[58] Field of Search............... 29/148.4 A, 148.4 R; 308/207; 64/17

[56] References Cited
UNITED STATES PATENTS
3,009,748 11/1961 Pitner ................................ 308/207
3,492,710 2/1970 Pitner .......................... 29/148.4 A Primary Examiner—Thomas H. Eager
Attorney—Robert E. Burns et al.

[57] ABSTRACT

Universal joint in which the needle bearing cup surrounding each trunnion of the cross member of the joint has a non-circular cross-sectional shape so that the passage for the needles is smaller in the zones in which the forces are transmitted by the joint than in the rest of the passage for the needles. This is achieved by an interaction between the branch of the material of the yoke surrounding the bore and the cup which deforms the cup in the desired manner. A method is disclosed for achieving this result.

11 Claims, 5 Drawing Figures

Patented Aug. 21, 1973  3,753,277

$a_0 > b_0$ $a > b$ $c_x < c_y$ $D > d$

METHOD OF MAKING UNIVERSAL JOINTS

This is a division of application Ser. No. 883,147, filed Dec. 8, 1969 now U.S. Pat. No. 3,660,989.

The present invention relates to a method for constructing universal joint comprising two yokes and a cross member having four trunnions each of which is capped by a needle cup fitted in the bore of the corresponding yoke branch, and more particularly concerns the adjustment of the diametral clearance for the needles in the cups.

It is known that, on an industrial scale, it is impossible to produce a needle bearing in which the diametrical clearance or play for the needles is zero at all points, which would be the ideal situation for the considered purpose. However, attempts have been made to approach this ideal situation by locally reducing the clearance. Thus, it has been proposed in the U.S. Pat. Nos. 2,983,560 and 3,009,748 to deform one of the raceways of the bearing so as to alternate circumferentially zones of reduced or zero clearance on a fixed or elastically yieldable support and zones of greater clearance.

As concerns needle cups of a universal joint, it is of interest to arrange that this clearance be small and even zero or negative in the zone in which the forces are transmitted. This is more particularly true in applications, as measuring and regulating apparatuses, in which the torques transmitted are relatively low in value but change in direction and in which it is important that the universal joint respond immediately to an input torque so that the output torque is transmitted without delay. Likewise, in a vehicle steering mechanism employing universal joints, absence of clearance in the direction of transmission of the steering force is desirable so that the driver can always feel through his steering wheel the response of the steering road wheels of the vehicle to the effort he exerts on the steering wheel in either direction.

The invention provides a method for constructing a universal joint comprising a cross member having four trunnions, two yokes respectively having an axis of rotation and two branches contained in a plane containing said axis and a bore in each branch for receiving a corresponding one of said trunnions, a needle bearing for each of said trunnions, said needle bearing comprising a cup engaged in the bore pertaining to the trunnion and having an inner face constituting a raceway defining an annular passage with the trunnion, and bearing needles disposed in said passage for circulation therein, comprising so shaping each of said branches in a portion thereof surrounding said bore that the interaction between the material of said branch which defines said bore and said cup, which has an initially cylindrical shape and is a force fit in said bore, imparts to said cup on a portion of the axial extent of said cup the desired non-circular shape, and force fitting said cup into said bore, thereby imparting said desired non-circular shape to a portion of the axial extent of said cup.

U.S. Pat. No. 3,321,256 teaches the ovalizing of one of the rings of the bearings, and more particularly the inner bearing ring, so as to modify the clearance for the needles. In this known bearing, the object is to reduce the clearance in the plane perpendicular to the direction of transmission of the forces which is radically different from the object of the present invention, the arrangements according to the present invention resulting in an increase in the clearance in this plane.

Further features and advantages of the invention will be apparent from the ensuing description with reference to the accompanying drawing.

Figure 1:
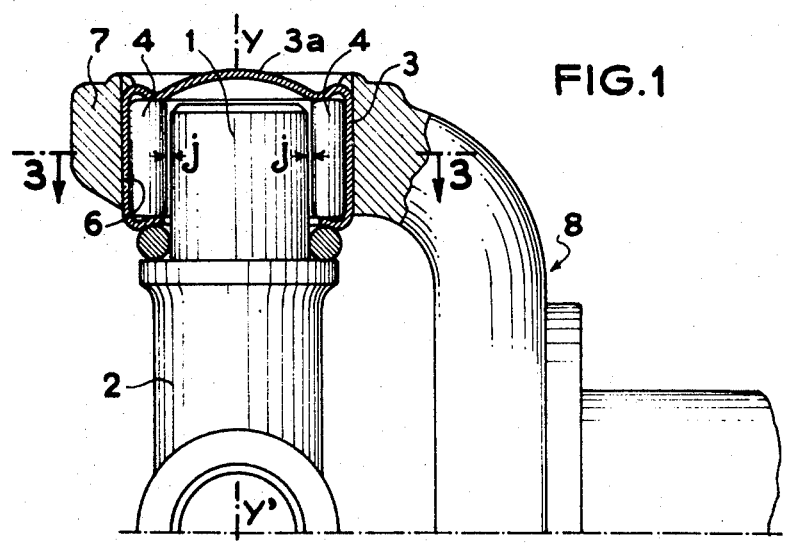
FIG. 1 shows, partly in elevation and partly in section, a universal joint in which the needle cup capping the trunnion is fitted in a bore in a yoke branch.

In the universal joint partly shown in FIG. 1, each of the trunnions 1 of the cross member 2 is capped by a cup 3 which encloses needles 4 and is fitted in the bore 6 of a branch 7 of a yoke 8.

Owing to the fact that the bore 6 has an oval shape or an elliptical shape (see FIG. 2) characterized by a half major axis $a_o$ contained in the plane of symmetry XX' of the yoke, the half minor axis $b_o$ being contained in the plane YY' perpendicular to the plane XX' in which the forces to be transmitted are applied, the cup 3 assumes, after having been force fitted in the bore, an oval shape defined by half axes $a$, $b$ (FIG. 3) contained in the plane of symmetry XX' and in the plane YY' respectively. Consequently, in the plane of symmetry XX', the needles have a clearance $j$ of positive value for their movement whereas in the plane of the applied forces YY' the clearance is zero or negative.

Figure 2:
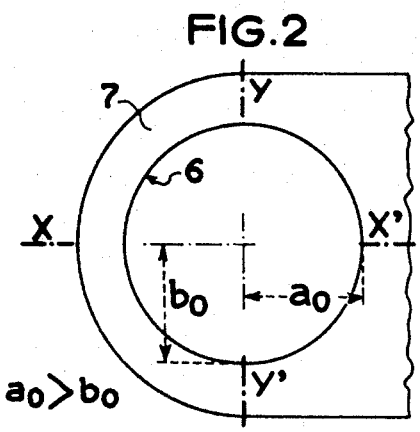
FIG. 2 is a partial plan view of the oval shape of the bore shown in FIG. 1.
Figure 3:
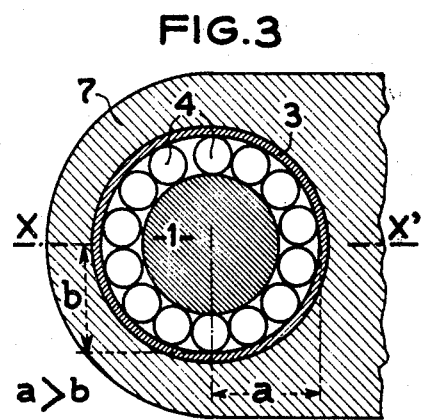
FIG. 3 is a sectional view taken along line 3—3 of FIG. 1.
Figure 4:
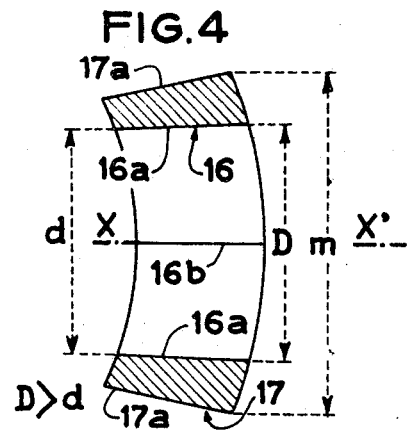
FIG. 4 is a sectional view in a plane perpendicular to the plane of symmetry of a yoke whose branches have the sectional shape of a segment of a cylinder.

Whereas, in FIGS. 1-3, the yoke branch 7 is assumed to have a flat or plane shape, the yoke branch shown in FIG. 4 has the shape of a segment of a cylinder whose axis is parallel to the axis of rotation of the yoke. This yoke may be produced, for example, by bending a plane strip in the manner taught by U.S. Pat. No. 3,501,928 which defines in the branch 17 two plane lateral faces 17a, 17b which are convergent towards the axis of rotation of the yoke. Owing to this convergence, the dimension $m$ of the branch, measured in a direction perpendicular to the plane of symmetry XX', decreases along the axis of the bore in the direction of the convergence of the lateral faces 17a, 17b.

Consequently, if the bore 16 is machined, as by broaching, to the theoretical shape of a circular cylinder, the reaction of the material surrounding the bore varies along the axis of the latter, the material giving way more where the thickness of the material is less, that is, in the region of the branch nearer the axis of rotation of the yoke. Thus, the final shape of the bore is not that of a true circular cylinder.

More precisely, the bore generatrices 16a, 16a in the plane of FIG. 4, namely the plane perpendicular to the plane of symmetry XX', are not parallel but slightly convergent towards the axis of rotation of the yoke so that the diameter D of the bore on the convex face of the yoke branch 17 is larger than the diameter $d$ on the concave face, whereas the generatrices 16b, 16b in the plane of symmetry XX' are generally parallel generatrices. Thus, the bore tapers in the plane perpendicular to the plane of symmetry in the fraction of the axial extent of the yoke branch which is the nearer to the concave face of this branch. In other words, after the needle cup has been fitted in the bore by force, the clearance allowed for the movement of the needles is smaller than the clearance allowed in the plane of symmetry XX'.

Figure 5:
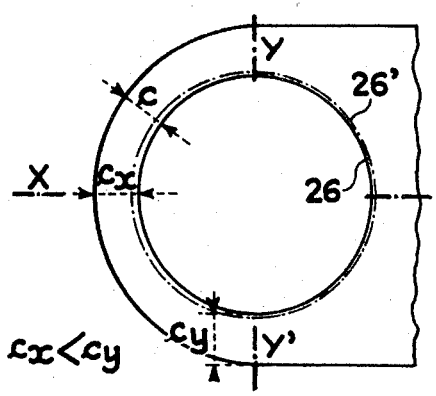
FIG. 5 is a partial plan view of a yoke branch similar to FIG. 2 showing a bore of circular shape.

In FIG. 5, the bore 26 of the yoke branch 27 is circular in the free state but the configuration of the yoke branch 27 is such that the thickness of material $c$, measured radially of the bore, between the bore face 26 and the outer face 27a of the branch 27 varies in such manner that the thickness $c_x$ in the plane of symmetry XX' is smaller than the thickness $c_y$ in the plane YY' perpendicular to the plane XX'. Consequently, the resistance opposed by the material of the yoke branch to the bearing cup-fitting stresses varies along the periphery of the bore and is less in the plane of symmetry XX', so that the deformation of the material in this plane is greater. This results in an ovalization of the bore indicated by the dot-dash line 26' (FIG. 5) which represents the deformed bore.

It will be understood that to ovalize the needle cup it is possible to employ simultaneously more than one of the means described hereinbefore or, if desired, all of these means. These means are moreover merely illustrative and others may be employed. Thus, the end wall 3a of the cup 3 may be given such shape that it performs the function of a stiffener for the cup so that the stiffness of this end wall is increased in a privileged direction, for example by providing a stiffening rib in the end wall 3a in a plane coinciding with the plane of symmetry XX' of the yoke so that the deformation of the bore is greater in this plane upon fitting the needle cup in the bore, which produces the desired increase in the clearance for the movement of the needles.

It is also possible, after having produced a bore having a circular cylindrical shape, to press-deform the corresponding yoke branch so as to ovalize the bore.

Although specific embodiments of the invention have been described, many modifications and changes may be made therein without departing from the scope of the invention.

Having now described my invention what I claim and desire to secure by Letters Patent is :

1. A method for constructing a universal joint comprising a cross member having four trunnions, two yokes respectively having an axis of rotation and two branches contained in a plane containing said axis and a bore in each branch for receiving a corresponding one of said trunnions, a needle bearing for each of said trunnions, said needle bearing comprising a cup engaged in the bore pertaining to the trunnion and having an inner face constituting a raceway defining an annular passage with the trunnion, and bearing needles disposed in said passage for circulation therein, comprising so shaping each of said branches in a portion thereof surrounding said bore that the interaction between the material of said branch which defines said bore and said cup, which has an initially cylindrical shape and is finally a force fit in said bore, imparts to said cup on a portion of the axial extent of said cup the desired non-circular shape, and force fitting said cup into said bore, thereby imparting said desired non-circular shape to a portion of the axial extent of said cup.

2. A method for constructing a universal joint comprising a cross member having four trunnions, two yokes respectively having an axis of rotation and two branches contained in a plane containing said axis and a bore in each branch for receiving a corresponding one of said trunnions, a needle bearing for each of said trunnions, said needle bearing comprising a cup engaged in the bore pertaining to the trunnion and having an inner face constituting a raceway defining an annular passage with the trunnion, and bearing needles disposed in said passage for circulation therein, comprising so shaping said bore that the interaction between the material which defines said bore and said cup, which has an initially cylindrical wall and is finally a force fit in said bore, imparts to said cup the desired non-circular shape, and force fitting said cup into said bore, thereby imparting said desired non-circular shape to said cup.

3. A method as claimed in claim 1, comprising so shaping the branch that its dimension, measured in a direction perpendicular to the said plane, is variable along the axis of said bore, said inner face of said cup being finally a complex surface whose diameter, in a direction perpendicular to said plane, varies along the axis of said bore owing to the variable reaction of said material which tends to give way more where the thickness of the material defining said bore is less.

4. A method as claimed in claim 3, wherein said branch has the shape of a segment of a cylinder obtained by bending a sheet of material initially having a rectangular cross-sectional shape.

5. A method as claimed in claim 1, wherein said branch has an outer free edge and such shape that the distance measured radially between the axis of said bore and said outer free edge is variable, a minimum for said distance being reached in said plane, said inner face of the cup finally defining a surface affording in said plane owing to the variable reaction of said material, a local diametral increase in the radial distance between said inner face and the corresponding trunnion for the movement of said needles.

6. A method as claimed in claim 1, wherein said cup has a transversely extending end wall and comprising imparting to said end wall an increased stiffness on a diameter of said end wall contained in said plane.

7. A method as claimed in claim 1, comprising imparting to said bore a circular cylindrical shape and thereafter ovalizing said bore by deformation of the corresponding branch by means of a press.

8. A method as claimed in claim 2, comprising so shaping the branch that its dimension, measured in a direction perpendicular to the said plane, is variable along the axis of said bore, said inner face of said cup being finally a complex surface whose diameter, in a direction perpendicular to said plane, varies along the axis of said bore owing to the variable reaction of said material which tends to give way more where the thickness of the material defining said bore is less.

9. A method as claimed in claim 2, wherein said branch has an outer free edge and such shape that the distance measured radially between the axis of said bore and said outer free edge is variable, a minimum for said distance being reached in said plane, said inner face of the cup finally defining a surface affording in said plane, owing to the variable reaction of said material, a local diametral increase in the radial distance between said inner face and the corresponding trunnion for the movement of said needles.

10. A method as claimed in claim 2, wherein said cup has a transversely extending end wall and comprising imparting to said end wall an increased stiffness on a diameter of said end wall contained in said plane.

11. A method as claimed in claim 2, comprising imparting to said bore a circular cylindrical shape and thereafter ovalizing said bore by deformation of the corresponding branch by means of a press.

* * * * *

UNITED STATES PATENT OFFICE
CERTIFICATE OF CORRECTION

Patent No. 3,753,277　　　　　　　　Dated August 21, 1973

Inventor(s) Alfred PITNER

It is certified that error appears in the above-identified patent and that said Letters Patent are hereby corrected as shown below:

In the Heading to the patent, Item [73] Assignee change "Malmaism" to --Malmaison--; and insert beneath the Assignee's address: --of a one-half interest--

Signed and sealed this 14th day of May 1974.

(SEAL)
Attest:

EDWARD M. FLETCHER, JR.　　　　　　C. MARSHALL DANN
Attesting Officer　　　　　　　　　　Commissioner of Patents